United States Patent [19]
Billings

[11] Patent Number: 5,165,351
[45] Date of Patent: Nov. 24, 1992

[54] APPARATUS AND METHOD FOR PLANTING SEEDS, FERTILIZING AND APPLYING CHEMICALS USING BIODEGRADABLE APPLICATOR TAPE

[76] Inventor: Lanny D. Billings, Rte. 1, Box 88, Orchard, Nebr. 68764

[21] Appl. No.: 737,316

[22] Filed: Jul. 29, 1991

[51] Int. Cl.⁵ .................. A01C 7/00; A01C 21/00
[52] U.S. Cl. ............................ 111/199; 47/56; 111/900
[58] Field of Search ............ 111/199, 900; 47/56

[56] References Cited

U.S. PATENT DOCUMENTS

| | | |
|---|---|---|
| 2,571,491 | 10/1961 | Schindler ........................ 47/56 |
| 2,998,706 | 9/1961 | Zitko ............................. 111/199 |
| 3,059,437 | 10/1962 | Jennings et al. ................ 111/199 |
| 3,065,605 | 11/1962 | Zitko ............................. 111/199 |
| 3,078,681 | 2/1963 | Zitko ............................. 111/199 |
| 3,294,045 | 12/1966 | Kelley et al. .................. 111/199 |
| 3,385,242 | 5/1968 | Chancellor ..................... 111/199 |
| 3,408,823 | 11/1968 | Okita et al. .................... 111/199 |
| 3,791,321 | 2/1974 | Tsutsumi . |
| 4,092,936 | 6/1978 | Griffin et al. ................... 111/199 |
| 4,866,879 | 9/1989 | Wood et al. .................... 111/199 |

FOREIGN PATENT DOCUMENTS

| | | | |
|---|---|---|---|
| 56687 | 7/1982 | European Pat. Off. ............ | 111/199 |
| 2219448 | 10/1973 | Fed. Rep. of Germany .......... | 47/56 |
| 2123663 | 2/1984 | United Kingdom .................. | 47/56 |

Primary Examiner—Randolph A. Reese
Assistant Examiner—Spencer Warnick
Attorney, Agent, or Firm—John A. Beehner

[57] ABSTRACT

A seed planter unit includes a frame adapted for connection to a prime mover, a furrow opener carried on the frame for opening a furrow in the grond in response to advancing movement of the frame, a seed tape dispenser operative to support an elongated biodegradable seed laden tape, structure for directing the tape downwardly from the dispenser into ground engagement behind the furrow opener and a first press wheel carried on the frame at a position to roll over the dispensed tape and hold it in a generally stationary position against the ground in response to advancing movement of the frame. Soil covering discs and a second press wheel may follow the first press wheel for burying and stabilizing the seed tape within the ground. Fertilizer and agricultural chemicals may be incorporated into the seed tape or separately dispensed tapes for controlled application adjacent the planted crops.

3 Claims, 4 Drawing Sheets

APPARATUS AND METHOD FOR PLANTING SEEDS, FERTILIZING AND APPLYING CHEMICALS USING BIODEGRADABLE APPLICATOR TAPE

BACKGROUND OF THE INVENTION

The present invention is directed to an improved apparatus and method for planting seeds, fertilizing and applying chemicals using biodegradable applicator tape.

Apart from the development of bigger and faster planter units, the process of planting agricultural seeds has changed very little over the years. Seeds are generally dispensed into the ground in uniformly spaced apart relation by a planter unit which may also be equipped with injectors or the like for dispensing fertilizer, pesticides or herbicides into the ground adjacent the seeds.

There are many problems associated with conventional planting techniques, many of which are particularly disadvantageous in view of environmental concerns. There is always the concern of planting at a preferably uniform and optimum rate to control the population of plants for most efficient crop production. Certain crops, such as lettuce, are planted by a slobber system wherein the crop is planted approximately ten times too thick and requires thinning to provide room for full growth of the crop. Rates of dispensing even conventional row crops, such as corn, soybeans and milo are seldom as uniform as desired.

Problems associated with the application of fertilizers and chemicals, such as herbicides and pesticides, include leaching and the danger of exposure to operators. Typically, excessive chemicals are applied because a certain proportion leaches into the ground and waterways where it raises pollution concerns. Herbicides are applied to prevent weeds from smothering and otherwise interfering with crop growth, but such herbicides are often objectionable because of their environmental concerns and the constraints they impose on crop rotation and the like. The alternative to the use of herbicides has been cultivation to uproot weeds between crop rows, but such cultivation requires expensive time and fuel and is ineffective for weeding between plants in a crop row.

The health risks to the applicator of agricultural chemicals have become increasingly unacceptable as medical research has revealed the present and future dangers of exposure to such chemicals by even a careful operator.

Accordingly, a primary object of the invention is to provide an improved apparatus and method for planting seeds, fertilizing and applying chemicals using biodegradable applicator tape.

Another object is to provide an apparatus and method of planting which assures a uniform planting rate to accurately control population of the planted crop.

Another object is to provide an improved apparatus and method for planting seeds wherein a biodegradable tape or strip covers the ground adjacent planted seeds to inhibit weed growth.

Another object of the invention is to provide an improved apparatus and method for planting seeds wherein the seeds are carried on an elongated biodegradable tape which may also carry fertilizer and/or pesticides in the precise amount needed and at the desired positions relative to the planted seeds for most efficient application.

Another object is to provide an improved apparatus and method of planting seeds wherein water, fertilizer and any applied chemicals are retained adjacent the planted crops for most efficient plant growth.

Another object is to provide an improved apparatus and method for planting seeds which minimizes or eliminates the health risks of exposure to dangerous agricultural chemicals.

Finally, it is an object of the invention to provide an improved apparatus and method for planting seeds which is simple in construction, economical to implement and efficient in operation.

SUMMARY OF THE INVENTION

The improved seed planter unit of the present invention includes a frame adapted for connection to a prime mover such as an agricultural tractor by the type of tool bar used for supporting conventional planter units. The improved seed planter unit includes a seed tape dispenser on the frame which is operative to support an elongated biodegradable seed laden tape. The tape is preferably arranged in a long roll which is rotatably supported within the dispenser and directed downwardly therefrom into ground engagement. The planter unit carries a furrow opener means for opening a furrow in the ground in response to advancing movement of the frame. The tape is directed into the ground behind the furrow opener where a first press wheel rolls over the dispensed tape and holds it in a generally stationary position against the ground in response to advancing movement of the frame. A pair of soil covering disks may follow the first press wheel to cover the tape with soil and a second press wheel may be provided behind the covering disks for tamping down the soil over the covered tape.

A drive train may be connected between the second press wheel and seed tape dispenser for directing tape from the dispenser at the precise ground speed of the second press wheel.

The tape itself is preferably formed as an elongated continuous strip of biodegradable paper having longitudinally spaced perforations therealong. The tape is preferably provided as a two-ply strip with seeds arranged between the plies in registration with the perforations. The seeds are held in place by an adhesive, preferably a vegetable pulp such as beet pulp.

Fertilizer and pesticides may be incorporated into the tape for application directly to the newly planted seeds. It is thought that in some cases, only approximately one tenth as much fertilizer and pesticides are needed if they can be applied in the right place. Herbicides likewise may be incorporated into the tape. The controlled application of fertilizer and chemicals according to the invention eliminates the temptation and need for overapplication and waste. The risk of exposure to the operator is virtually eliminated and the atmosphere remains free of the pollution from spray application of agricultural chemicals. The biodegradable paper tape of the invention not only properly places the fertilizer and pesticide relative to these seeds, but also retains the same, together with moisture for efficient utilization over an extended period of time.

DESCRIPTION OF THE PREFERRED EMBODIMENT

Figure 1:
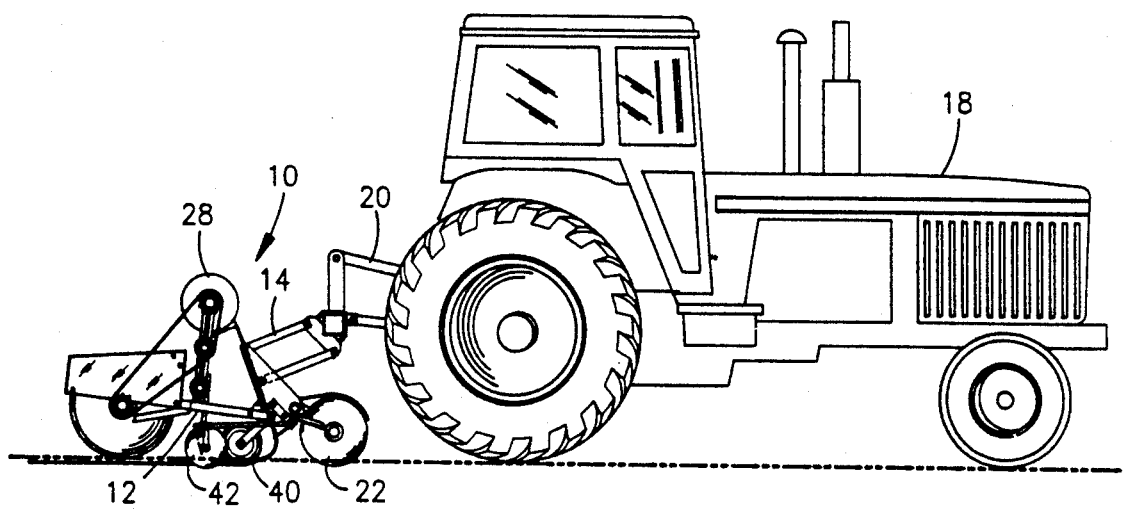
FIG. 1 is a side elevational view of the implement connected to an agricultural tractor.
Figure 2:
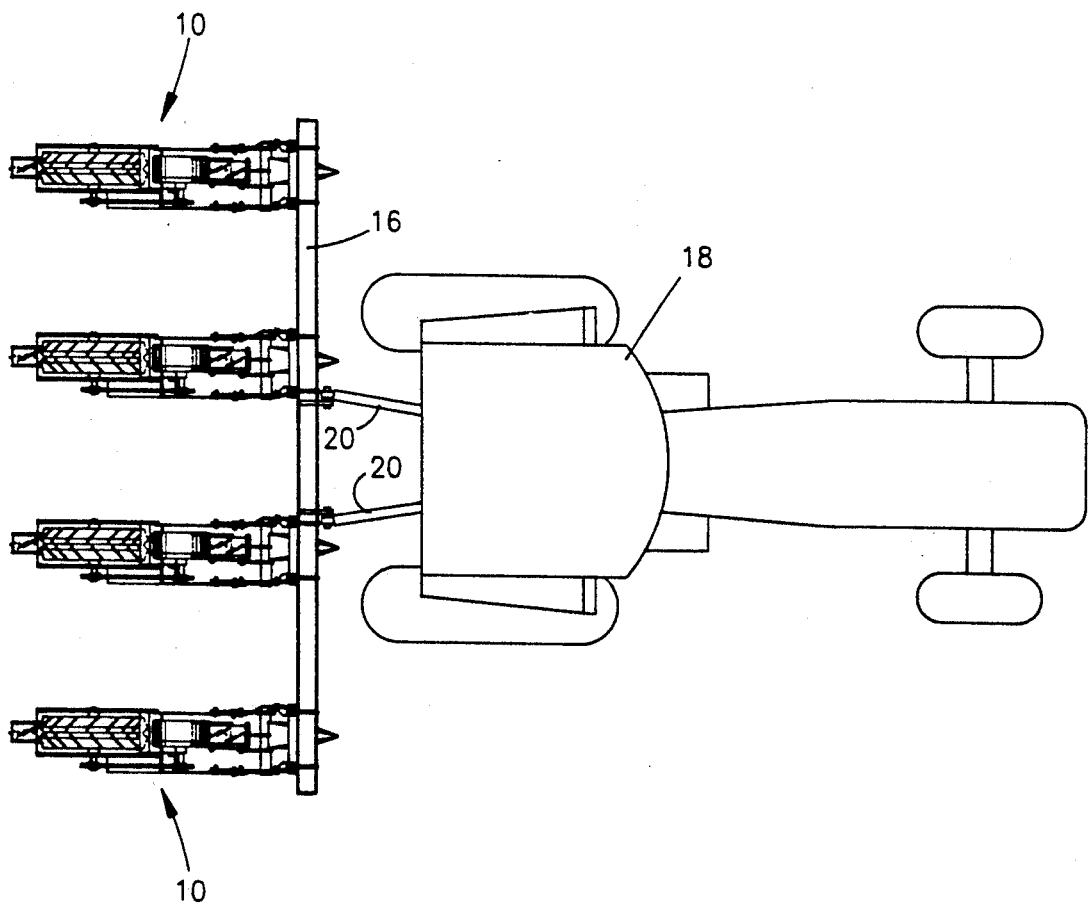
FIG. 2 is a top plan view of the planter mounted on the tractor.

The improved seed planter unit 10 of the present invention is illustrated in the drawings as including a frame 12 equipped with a parallelogram linkage 14 for a floating Connection to a conventional planter implement tool bar 16. The tool bar is connectable to an agricultural tractor 18 or any other prime moVer by either a three point hitch connection 20 or other conventional connection for a drawn implement.

A pair of furrow opener disks 22 are rotatably carried at the forward end of frame 12 for opening a furrow in the ground in response to advancing movement of the planter unit. These disks may be of conventional construction and may be provided with a cover shield 24 and scraper blades 26 for clean efficient operation of the disks.

Figure 4:
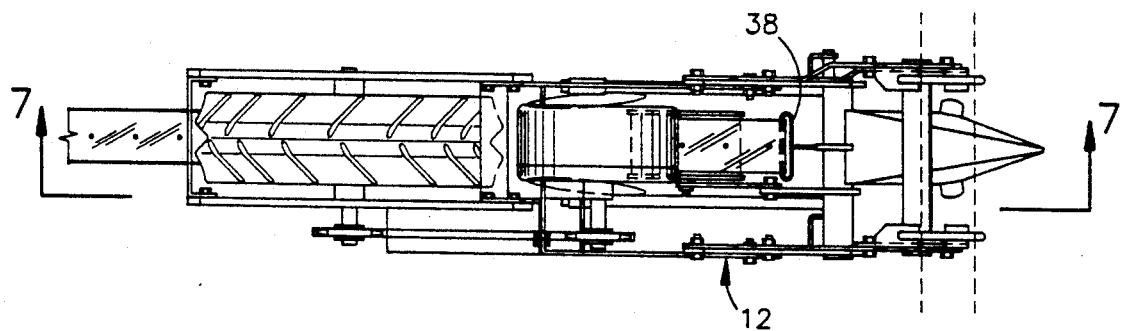
FIG. 4 is an enlarged detailed top plan view of the planter implement.

A seed tape dispenser 28 is carried on frame 12 above and rearwardly of the furrow opener disks 22. Dispenser 28 is preferably a relatively large generally circular housing having a rotatable central shaft 30 for receipt within the core 32 of a roll 34 of biodegradable seed laden tape. The free end of the tape roll is directed outwardly through an opening 36 and is directed downwardly by guide means, such as the generally T-shaped wire guide 38, shown best in FIGS. 4 and 5. After passage through guide 38, the tape is directed under the ground where it is engaged and pressed into position by a first press wheel 40.

First press wheel 40 is at least as wide as the tape or tapes being dispensed onto the ground and has a relatively flat exterior surface for pressing the tape flat against the ground. First press wheel 40 may be an idler wheel in one embodiment for keeping a degree of tension on the seed tape being dispensed.

Figure 5:
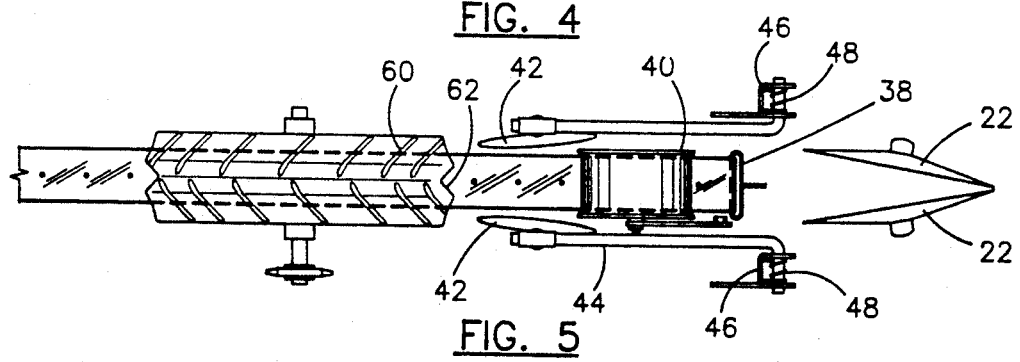
FIG. 5 is a top view of certain lower portions of the planter with structure above it removed for clarity.

Rearwardly of the first press wheel 40 a pair of soil covering disks 42 are rotatably carried on rearwardly extended support arms 44 for covering the tape with a layer of soil. The forward ends of support arms 44 are bent outwardly as shown in FIG. 5 for receipt within a pair of brackets 46 including springs 48 for urging the soil covering disks 42 downwardly into ground engagement. Brackets 46 are stationarily secured to frame 12.

Figure 7:
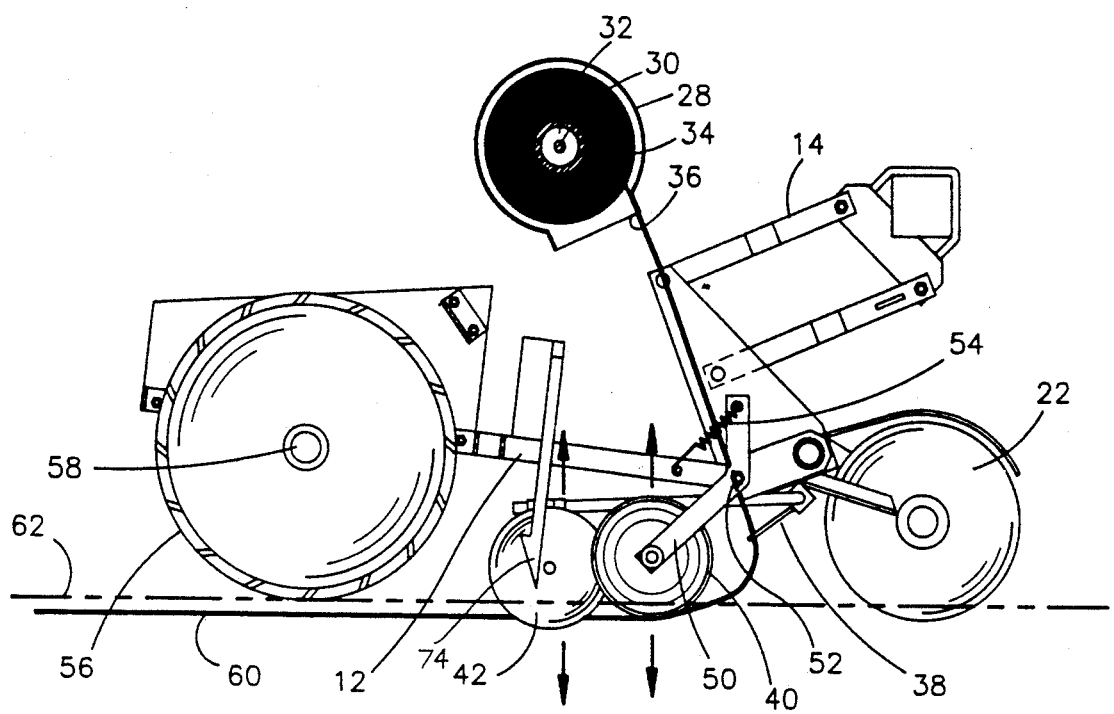
FIG. 7 is a side view as seen on line 7—7 in FIG. 4 to show the dispensing path for the seed tape.

Likewise, the first press wheel 40 is rotatably oarried on a pair of downwardly and rearwardly inclined support arms 50, as shown best in FIG. 7. The arms are pivotally connected to the frame at 52 and extend upwardly therefrom for engaging a tension spring 54 which urges the first press wheel 40 downwardly into ground engagement.

Rearwardly of the soil covering discs 42, a larger diameter second press wheel 56 is rotatably supported on frame 12 for rotation about a transverse axis 58.

Referring to FIG. 5, the second press wheel 56 may have a conventional tread surface 60 coupled with a central groove 62 which is adapted to be aligned with the row of seeds of the soil covered seed tape 60. Dotted line 62 in FIGS. 3, 7 and 8 indicate the top of the soil covering over the buried seed tape 60.

Figure 3:
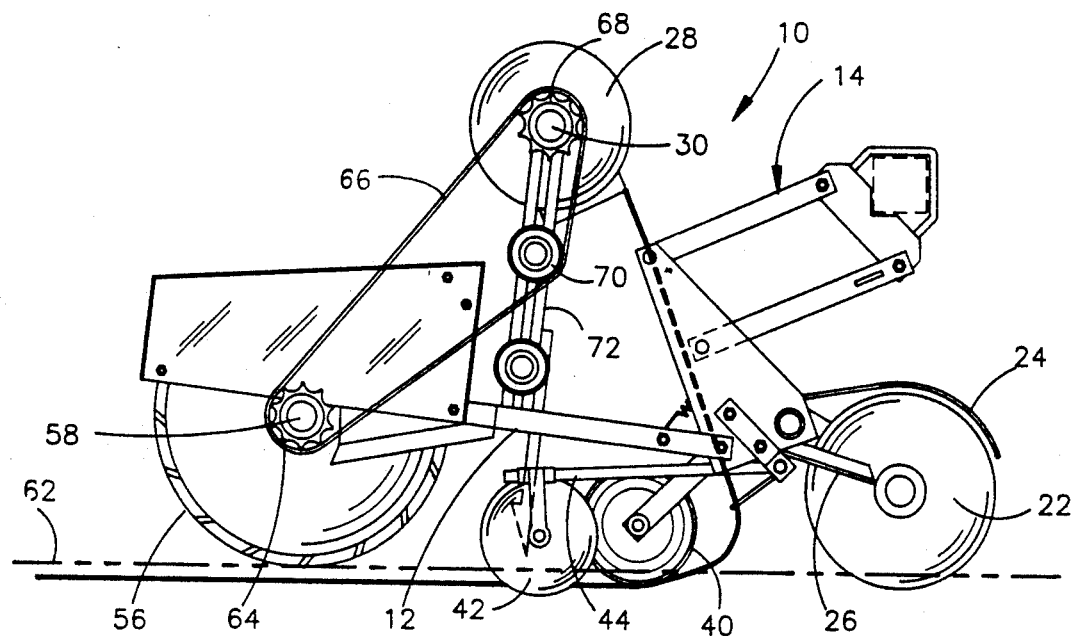
FIG. 3 is an enlarged side elevational view of the planter implement.

To dispense the seed laden tape roll 34 from dispenser 28, a drive train may connect the second press wheel 56 to the shaft 30 of seed tape dispenser 28 as shown best in FIG. 3. A sprocket 64 on the axle 58 of second press wheel 56 is connected by a chain, belt or the like 66 to a similar sprocket 68 on seed tape dispenser shaft 30 and an adjustable belt tightener pulley 70 is height adjustably connected on the seed tape dispenser support posts 72. Whereas tape could be drawn from the dispenser by the action of the first press wheel engaging the seed tape against the ground, it is preferred that the tape be actively dispensed to eliminate tension in the tape and friction between the first press wheel and seed tape.

Figure 8:
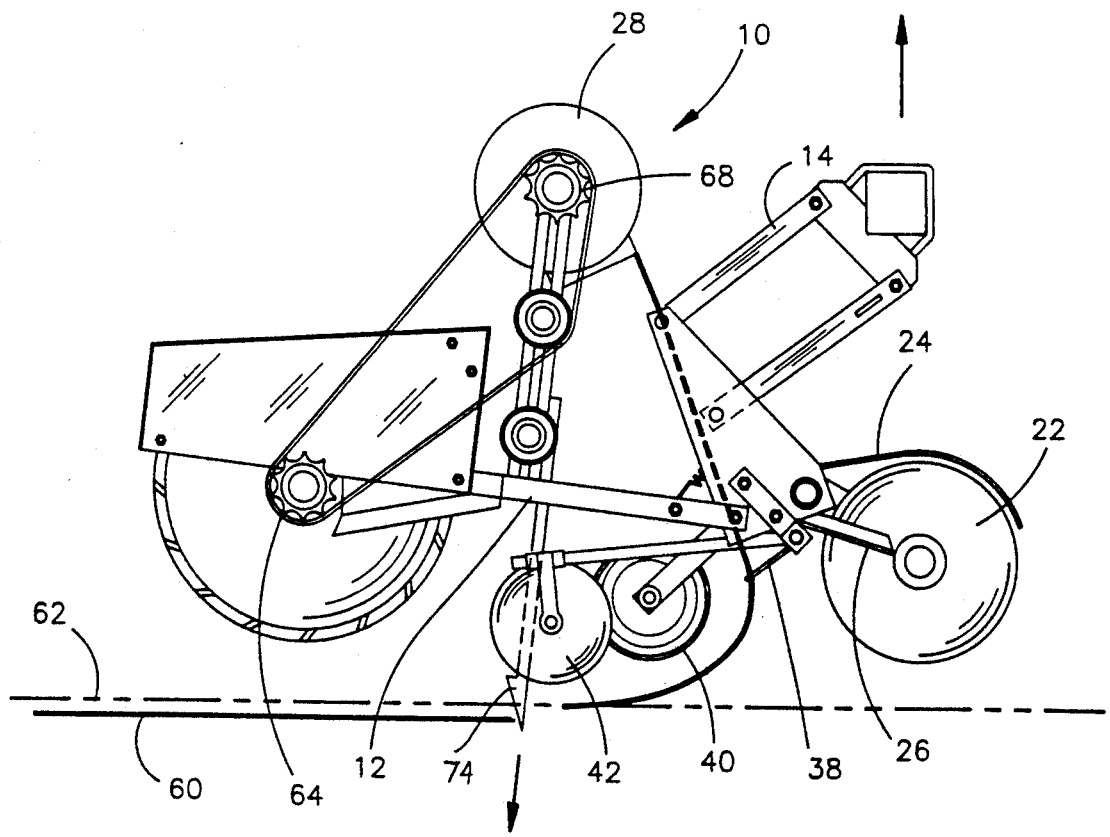
FIG. 8 is a side elevational view of the planter with the seed tape being severed by a cutter upon elevation of the planter from its lowered working position to a raised transport position.

When the tractor drawn seed planter unit reaches the end of a row, the operator need only activate the tractor hydraulic system to raise the tool bar 16 by the tractor three-point hitch 20. A separately actuatable cutter knife 74 is carried on frame 12 for severing the tape, as shown in FIG. 8, at any selected position. The cutter knife may be mechanically actuated by raising movement of the frame or it may be separately electrically or hydraulically driven. The knife 74 is preferably vertically reciprocal between the raised working position of FIG. 7 and the lowered cutting position of FIG. 8.

Upon repositioning of the tractor at the beginning of another crop row, the operator activates the three point hitch to lower the tool bar 16 and seed planter unit 10 back into ground engagement for further dispensing of the seed tape in the manner illustrated in FIG. 7.

Figure 6:
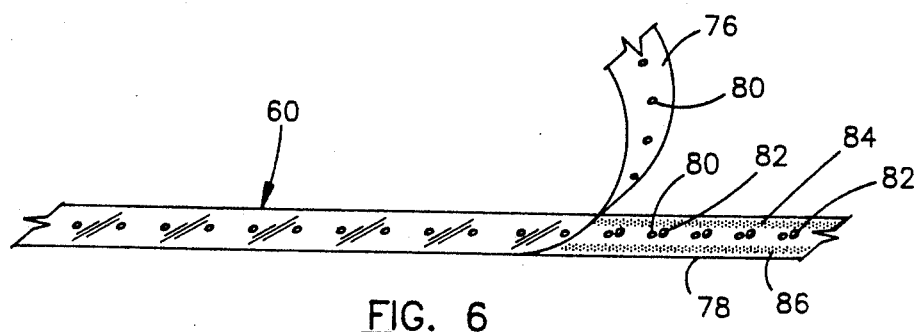
FIG. 6 is a partial perspective view of a portion of a seed tape with one end opened to show the seed and fertilizer contained therein.

One example of a seed tape 60 is illustrated in FIG. 6 as a two-ply strip of top and bottom plies 76 and 78 of biodegradable paper with registered perforations 80 therethrough and seeds 82 engaged between said plies 76 and 78 in registration with the perforations 80 therethrough. The seeds 82 are shown in FIG. 6 in adjacent relation to the perforations 8o but are generally preferred to be centered relative to the perforations. An adhesive, preferably a vegetable adhesive such as beet pulp, secures the plies together and secures the seeds in position between the plies. Rows 84 and 86 of a fertilizer may be incorporated into the tape between plies 76 and 78 for retention adjacent the seeds and within the water retaining biodegradable paper tape for most efficient application for aiding plant growth.

Figure 9:
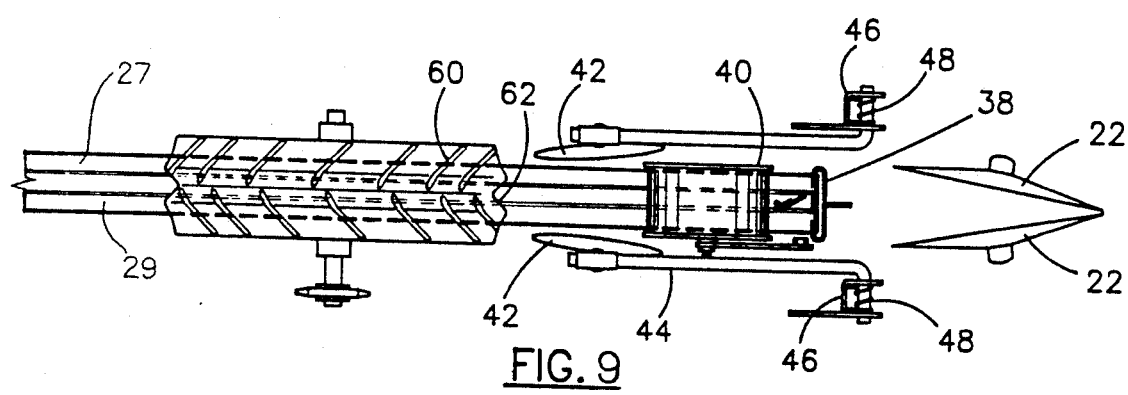
FIG. 9 is a top view of certain lower portions of the planter with structure above removed for clarity and showing the planter dispensing multiple tapes.

The seed tape is preferably made of second grade recycled paper of up to twelve inches or more in width for an effective ground cover to inhibit weed growth. Pesticides and herbicides may additionally be incorporated into the seed tape in uniform distribution therealong for controlled treatment in the ground adjacent each crop row. In the alternative, multiple tapes may be dispensed from one or more seed tape dispensers 28 with one tape perhaps carrying the seeds and other tapes carrying fertilizer, pesticides or herbicides. In this manner, the farmer is given more options for adjusting the application of fertilizer and chemicals to particular fields. Such narrower tapes might be provided as thin ribbons of one to two inches in width or in wider tapes of up to approximately three inches in width. In this embodiment, it is preferred that the multiple tapes be dispensed from a single seed planter unit 10 so that the individual seed, fertilizer 27 and pesticide 29 tapers are placed in the same furrow, as shown in FIG. 9.

The fertilizer and chemicals are not only carried by the tape but are actually absorbed and retained in position adjacent the seeds by the tape. The paper tape generally degrades in approximately one hundred days which thereby keeps the farmer's options open for rotating the field to a different crop during the next planting season.

The fertilizer, pesticides and chemicals may be incorporated into the seed tape 60 in many different forms. Liquid fertilizers and chemicals could be absorbed by the paper tape or granular fertilizer, pesticides and chemicals could be laid out in rows between the adhesively joined plies of tape. The fertilizer could furthermore be provided in a continuous rope-like form to be bound to the seed tape by adhesives or any other suitable means.

Just like a board retains moisture on its underside when lying in the dirt, as can be seen when the board is lifted, the seed tape of the present invention tends to retain moisture in the same manner as well as by absorption. This tends to resist washing away of the fertilizer and chemicals by rainwater.

The seed tape planting system of the invention is applicable for many types of crops. Hearty row crops such as corn and beans which easily surface, are prime prospects for the invention but even crops with lower structure of tissue such as milo or even weak vegetables such as carrots are suitable. Certain vegetables such as lettuce, which are typically planted by a slobber system which requires thinning after planting, can be far more efficiently planted at the desired population using the seed tape planting system of the invention.

It is contemplated that the seed tape dispenser, drive means for the dispenser, tape guides and tape cutter could all be provided as a kit for adapting conventional planter units to the seed tape planting system of the invention.

The method of planting seeds, according to the present invention, includes the steps of providing an elongated biodegradable tape having longitudinally spaced perforations therealong, arranging seeds in registered relation adjacent said perforations, securing the seeds to the tape and laying the tape on the ground to form a crop row. The method may further include covering the tape with soil and tamping down the soil covering the tape. The method may still further include carrying fertilizer, pesticides, herbicides, insecticides or the like on the elongated biodegradable tape or dispensing several tapes incorporating these respective applications adjacent a separate seed laden tape.

Whereas the invention has been shown and described in connection with preferred embodiments thereof, it is understood that there are many modification, additions and substitutions which may be made within the intended broad scope of the appended claims.

Thus there has been shown and described an improved method and apparatus for planting seeds, fertilizing and applying chemicals using biodegradable applicator tape, which apparatus and method accomplish at least all of the stated objects.

I claim

1. A seed planter unit, comprising,
    a frame,
    means for connecting said frame to a primer mover,
    furrow opener means carried on said frame and operative to open a furrow in the ground in response to advancing movement of the frame,
    a seed tape dispenser on said frame and operative to support an elongated biodegradable seed laden tape,
    means for directing tape downwardly from said dispenser into ground engagement behind the said furrow opener means,
    a first press wheel carried on said frame and operative to roll over the dispensed tape and hold it in a generally stationary position against the ground in response to advancing movement of the frame,
    said tape further comprising an elongated strip of paper having generally uniformly spaced perforations along the length thereof and seeds secured to said tape within selected perforations, and
    said seed tape dispenser operative to support and dispense a plurality of tapes including an elongated biodegradable seed laden tape, an elongated biodegradable fertilizer laden tape and an elongated biodegradable pesticide laden tape.

2. A method of field planting seed tape wherein the planting operation is performed by a seed planter unit adopted to dispense seed tape, said method further comprsiing
    providing an elongated biodegradable tape having longitudinally spaced perforations therealong,
    arranging seeds in registered relation adjacent said perforations,
    securing said seeds to said tape,
    providing a biodegradable fertilizer-laden tape for placement adjacent said biodegradable tape holding said seeds, and
    laying said taped on the ground to form a crop row.

3. A method of field planting seed tape wherein the planting operation is performed by a seed planter unit adopted to dispense seed tape, said method further comprising:
    providing an elongated biodegradable tape having longitudinally spaced perforations therealong,
    arranging seeds in registered relation adjacent said perforations,
    securing said seeds to said tape,
    providing a biodegradable pesticide-laden tape for placement adjacent said biodegradable tape holding said seeds, and
    laying said tapes on the ground to form a crop row.

* * * * *